United States Patent
Darcy et al.

(10) Patent No.: US 7,499,956 B1
(45) Date of Patent: **\*Mar. 3, 2009**

(54) ANNOTATION PROCESSING FROM SOURCE FILES AND CLASS FILES

(75) Inventors: Joseph D. Darcy, Mountain View, CA (US); Scott Seligman, Cupertino, CA (US)

(73) Assignee: Sun Microsystems, Inc., Santa Clara, CA (US)

( \* ) Notice: Subject to any disclaimer, the term of this patent is extended or adjusted under 35 U.S.C. 154(b) by 451 days.

This patent is subject to a terminal disclaimer.

(21) Appl. No.: 11/166,583

(22) Filed: Jun. 24, 2005

Related U.S. Application Data

(63) Continuation-in-part of application No. 11/137,727, filed on May 24, 2005.

(51) Int. Cl.
*G06F 17/30* (2006.01)

(52) U.S. Cl. .......................... 707/203; 707/1

(58) Field of Classification Search ............. 707/1, 707/100, 102, 200, 202–204
See application file for complete search history.

(56) References Cited

U.S. PATENT DOCUMENTS

| | | | |
|---|---|---|---|
| 6,572,661 B1* | 6/2003 | Stern | 715/203 |
| 2005/0234891 A1* | 10/2005 | Walther et al. | 707/3 |

\* cited by examiner

*Primary Examiner*—Cheryl Lewis
(74) *Attorney, Agent, or Firm*—Martine Penilla & Gencarella, LLP

(57) ABSTRACT

Methods for processing annotations from files are provided. The method initiates with identifying an annotation present in a source file or a class file, and identifying factories available for processing annotations. The method includes determining annotations supported by each of the available factories. Then, one of the available factories is assigned to process the annotation based on the annotation present in the source file or the class file being supported by the one of the available factories. The annotation processing tool directly accesses the class files to process the annotations. The explicitly processed class files may or may not be referenced by source files.

22 Claims, 5 Drawing Sheets

ANNOTATION PROCESSING FROM SOURCE FILES AND CLASS FILES

CROSS REFERENCE TO RELATED APPLICATIONS

This application is a continuation-in part to U.S. patent application Ser. No. 11/137,727 filed on May 24, 2005, and entitled "ANNOTATION PROCESSOR DISCOVERY." This application is herein incorporated by reference in its entirety for all purposes.

BACKGROUND

End developers face the tedious task of having to manually maintain consistency among multiple sets of files. The end developers must maintain the consistency of source code that is unique and original and the code that is implied by the unique and original source code. Annotations are pieces of metadata which can be associated with program elements such as classes, fields, and methods. An intended use of annotations involves having annotations in a base file hold information that is used to generate new derived files. These new derived files must be logically consistent with the base file and its annotations. The end developer must maintain the consistency for each set of code; to ease development the generation of the derived files should be automated.

One attempt to provide assistance to end developers could be through the use of the Javadoc program. Javadoc is a program used to create the Hyper Text Markup Language (HTML)-format JAVA™ API documentation. It is distributed as part of the JAVA™ SDK and its output stage is designed to be extensible through Doclet creation. The Doclet API provides the infrastructure to access all aspects of a JAVA™ source-code file that has been parsed by Javadoc. By using the Doclet API, a user can walk through a JAVA™ class description, access custom Javadoc tags, and write output to a file. However, the Javadoc program is limited to running a single Doclet and no properties of the Doclet are queried to determine if the Doclet should be run. Therefore, it is impractical to automatically find and run a doclet appropriate to the annotations present on the original source code. Accordingly, the Javadoc program is not a viable solution to the end developers to alleviate some of the above mentioned tedium.

In light of the foregoing, it is desirable to implement a scheme for alleviating the burden requiring end developers to maintain consistency of multiple sets of files through a tool that provides the infrastructure to allow third parties to generate implied code. In addition, it would be beneficial to have the capability to perform annotation processing irrespective of whether the annotations originate from a source file or a class file.

SUMMARY

Embodiments of the present invention provide a scheme for processing annotations from source files and class files. The present invention can be implemented in numerous ways, including as a process, a tool, a system, or a method. Several embodiments of the present invention are described below.

In one embodiment, a method for processing annotations present in a class file is provided. After receiving the class file, the method initiates with identifying an annotation present in the class file and identifying factories available for processing annotations. The method includes determining annotations supported by each of the available factories. Then, one of the available factories is assigned to process the annotation based on the annotation present in the class file being supported by the one of the available factories.

In another embodiment, a computer readable medium having program instructions for providing annotation processors is provided. The computer readable medium includes program instructions for identifying an annotation present in a class file and program instructions for identifying factories available for processing annotations. Program instructions for determining annotations supported by each of the available factories are included. Program instructions for assigning one of the available factories to process the annotation based on the annotation present in the class file being supported by the one of the available factories are also provided.

In yet another embodiment, an annotation processing tool for processing annotations present in a class file is provided. The annotation processing tool receives the class file and analyzes the class file to identify an annotation. The annotation processing tool searches for available factories, which may occur contemporaneously with analyzing the class file. Supported annotations are extracted for each of the available factories and each of the annotations present in the class file is matched with one of the factories, wherein the factory matched with the annotation is configured to support the annotation.

Other aspects of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION

Figure 1:
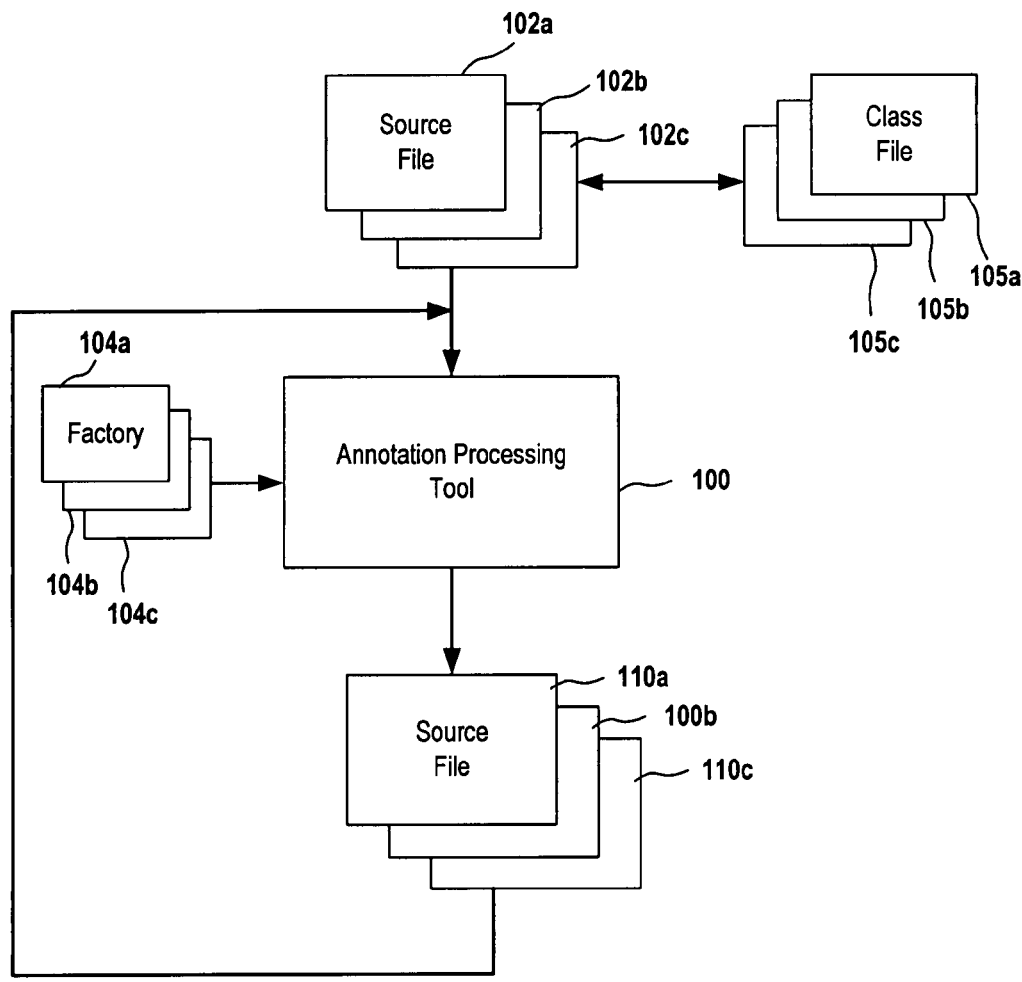
FIG. 1 is a simplified schematic diagram of an annotation processing tool that processes annotations present.

An invention is described for a tool and systematic method assisting a developer in the generation of sets of logically consistent files. The embodiments described below describe an annotation processing tool that processes annotations from both source files and class files. It will be obvious, however, to one skilled in the art, that the present invention may be practiced without some or all of these specific details. In other instances, well known process operations have not been described in detail in order not to unnecessarily obscure the present invention.

The annotation processing tool discussed herein finds and executes annotation processors based on the annotations present in the set of specified source files or class files being examined. The annotation processors use a set of reflective application programming interfaces (API) and supporting infrastructure to perform the processing of program annotations. The annotation processing tool reflective APIs provide a build time, source based, read-only view of program structure. The annotation processing tool runs annotation processors, which in turn, can produce new source files or new class files having further annotations. In addition, the annotation processing tool can cause compilation of both original and newly generated source files or class files, thereby easing the burden of the end developers during the development cycle. Through the annotation processing tool, the annotations present on the source files or the class files being operated on are determined. Then, the annotation processing tool looks for annotation processor factories that have been written. Annotation processor factories or factories as used herein refer to a factory for creating annotation processors. Each factory is responsible for creating processors for one or more annotation types. An annotation processor is plug-in code that completes functionality based on the annotation. Each annotation processor is created to process annotations of a particular annotation type or set of annotation types. The annotation processor may use its environment to find the program elements with annotations of those types and may freely examine any other program elements in the course of its processing. An annotation processor is constructed by a factory, which provides it with an environment that encapsulates the state it needs.

The annotation processing tool queries the factories as to what annotations they process. In return to this query, the factory provides the annotations recognized by the factory or by any of the processors the factory may create. If there are no options recognized by the factory, then an empty collection is returned. Then, the annotation processing tool requests a factory to provide an annotation processor if the factory processes an annotation present in the source files or the class files being operated on. The annotation processors are then run and if the annotation processors generate new source files or new class files, these new files are fed back into the annotation processing tool. The annotation processing tool will then repeat this process until neither new source files nor new class files are generated.

FIG. 1 is a simplified schematic diagram of an annotation processing tool that implicitly processes annotations present in class files. Annotation processing tool 100 receives as input source files 102*a-c* that respectively reference the class files 105*a-c*. If the class files 105*a-c* have annotations, the annotations in those class files could be processed by an annotation processor as if the annotations were present in the source files 102*a-c*. It should be appreciated that one source file could reference one or more class files, and one class file could be referenced by one or more source files.

Annotation processing tool 100 also receives as input a list of factories represented by factories 104*a-c*. In essence, annotation processing tool 100 looks at the structure of the code and which parts have annotations. It should be appreciated that the annotation processing tool 100 does not completely compile the source file, i.e., the code is partially analyzed. During this partial analysis the internal structure of classes/methods/fields and the high level declarative structure for each class method is looked at to determine what annotations are present in the source files. This partially analyzed code, which identifies the annotations present in the source files, essentially provides a model of the source file that includes all the annotations.

Through factory lists 104*a-c* of FIG. 1, it is possible to determine which annotations each factory is capable of supporting. In one embodiment, the factory communicates the annotations supported to the tool through a supportedAnnotationTypes method, which returns the names of the annotation types supported by the factory. Thus, by matching the factories supported with the annotations identified in the source files, the proper annotation processors may be obtained for each of the annotations in the source files. As used herein, the annotation processor represents a plug-in code that completes the functionality based on the annotation. It should be appreciated that the annotation processors may generate additional source files such as the source files 110*a-c* that have additional annotations. These additional annotations are fed back into the annotation processing tool 100 in order to identify a factory and an annotation processor capable of supporting those additional annotations. It should be appreciated that each factory is capable of creating one or more annotation processors, and the annotation processing tool directs factories to create annotation processors for particular declarations.

When the annotation processing tool is searching for processor factories, it should be appreciated that in one embodiment an algorithm for finding default implementations for system services may be used. One exemplary algorithm is the sun.misc.Service algorithm available from the assignee. In essence, this algorithm looks inside a jar file to find a service associated with a particular interface. In another embodiment, the name of the factory or the path to look on may be specified. For example, the name of the factory may be given on the command line.

Although the annotations represented in the class files 105*a-c* can be accessed by the annotation processing tool 100 implicitly, the types of annotations in the class files 105*a-c* would not participate directly in the annotation discovery process. Thus, through the embodiments described below, a scheme for directly accessing annotations in the source files and/or class files and enabling the annotations of class files to participate explicitly in the annotation discovery process, is provided.

Figure 2:
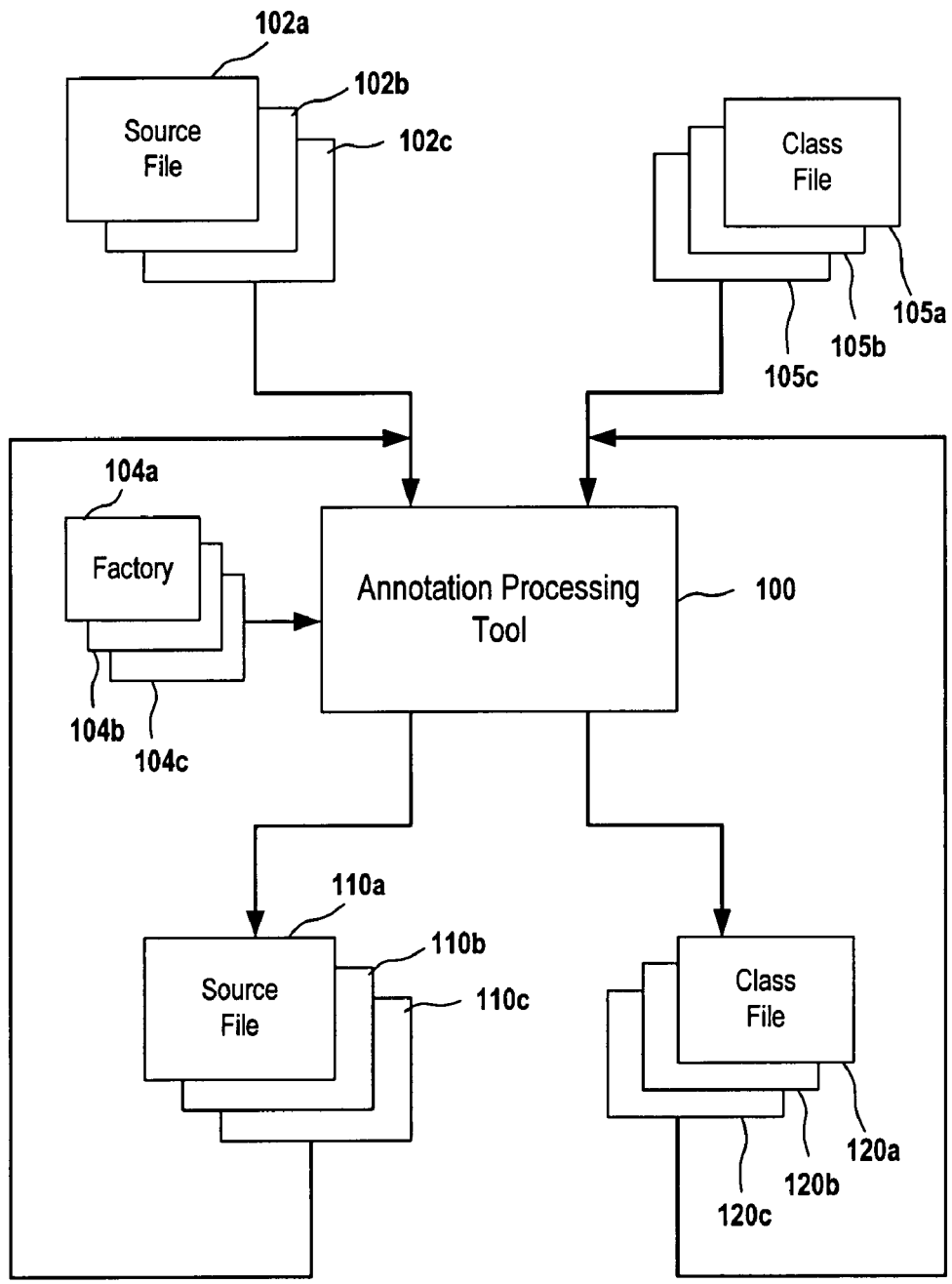
FIG. 2 is a simplified schematic diagram of an annotation processing tool that explicitly processes annotations present in source files and/or class files in accordance with one embodiment of the invention.

FIG. 2 is a simplified schematic diagram of an annotation processing tool that explicitly processes annotations present in source files and/or class files in accordance with one embodiment of the invention. Annotation processing tool 100 either receives the source files 102*a-c* and/or the class files 105*a-c* as inputs. In one embodiment, the name of a class can be obtained from a command line. In another embodiment, the name of a class can be an output of an annotation processor. Annotation processing tool 100 also receives as input a list of factories represented by factories 104*a-c*. Annotation processing tool 100 processes the source files or the class files and looks at the structure of the code and which parts have annotations.

If the input file is a source file, it should be appreciated that the annotation processing tool 100 does not completely compile the source file, i.e., the code is partially analyzed. During this partial analysis the internal structure of classes/methods/fields and the high level declarative structure for each class method is looked at to determine what annotations are present in the source files. This partially parsed code, which identifies the annotations present in the source files, essentially provides a model of the source file that includes the annotations. However, certain annotations present in a source file might not be modeled, such as the annotations on local and anonymous classes. An analogous model of the declarative structure is built for class files.

Through factory lists 104*a-c* of FIG. 2, it is possible to determine which annotations each factory is capable of supporting. In one embodiment, the factory communicates the annotations supported to the tool through a supportedAnnotationTypes method, which returns the names of the annotation types supported by the factory. Thus, by matching the factories supported with the annotations identified in the source files or the class files, the proper annotation processors may be obtained for each of the annotations in the source files or the class files. As used herein, the annotation processor represents a plug-in code that completes the functionality based on the annotation. Either source files or class files generated through the annotation processors can lead to the generation of additional source files or class files. It should be appreciated that the source files generated through the annotation processors may cause the annotation processors to generate additional source files such as the source files 110a-c that have additional annotations. It should also be appreciated that the class files generated through the annotation processors may cause the annotation processors to generate additional class files such as the class files 120a-c that have additional annotations. These additional annotations in either the newly generated source files or the newly generated class files are fed back into the annotation processing tool 100 in order to identify a factory and an annotation processor capable of supporting those additional annotations. It should be appreciated that each factory is capable of creating one or more annotation processors, and the annotation processing tool directs factories to create annotation processors for particular declarations.

When the tool is searching for processor factories, it should be appreciated that in one embodiment an algorithm for finding default implementations for system services may be used. One exemplary algorithm is the sun.misc.Service algorithm available from the assignee. In essence, this algorithm looks inside a jar file to find a service associated with a particular interface. In another embodiment, the name of the factory or the path to look on may be specified. For example, the name of the factory may be given on the command line.

Figure 3:
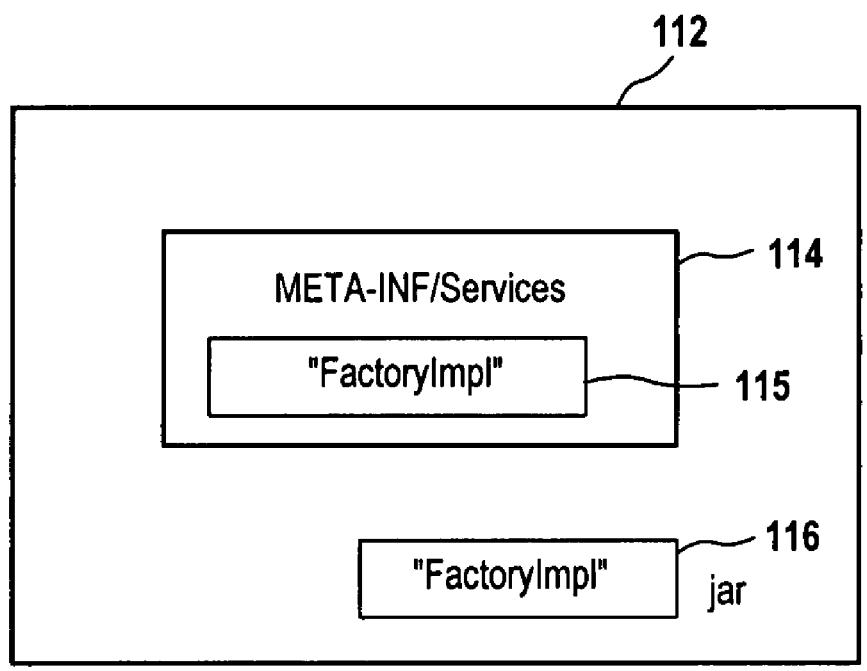
FIG. 3 is a simplified schematic diagram of a jar file, which may be used to search for factories in accordance with one embodiment of the invention.

FIG. 3 is a simplified schematic diagram of a jar file, which may be used to search for factories in accordance with one embodiment of the invention. File 112 represents a jar file. For example, for a particular interface, such as FactoryImpl the implementation can be looked up in a class file 116 for the implementation of Factory. It should be appreciated that jar file 112 is a collection of class files, i.e., compiled Java code, for a particular service. Thus, jar file 112 indicates that it implements a particular service or services and interfaces, and where the implementations are stored for the particular services and interfaces. META-INF/services directory 114 provides the factory name 115 "FactoryImp1", which in turn is used to find factory 116. One skilled in the art will appreciate that for the embodiments described herein there can be any number of factories and any number of jar files, which may come from multiple sources.

Figure 4:
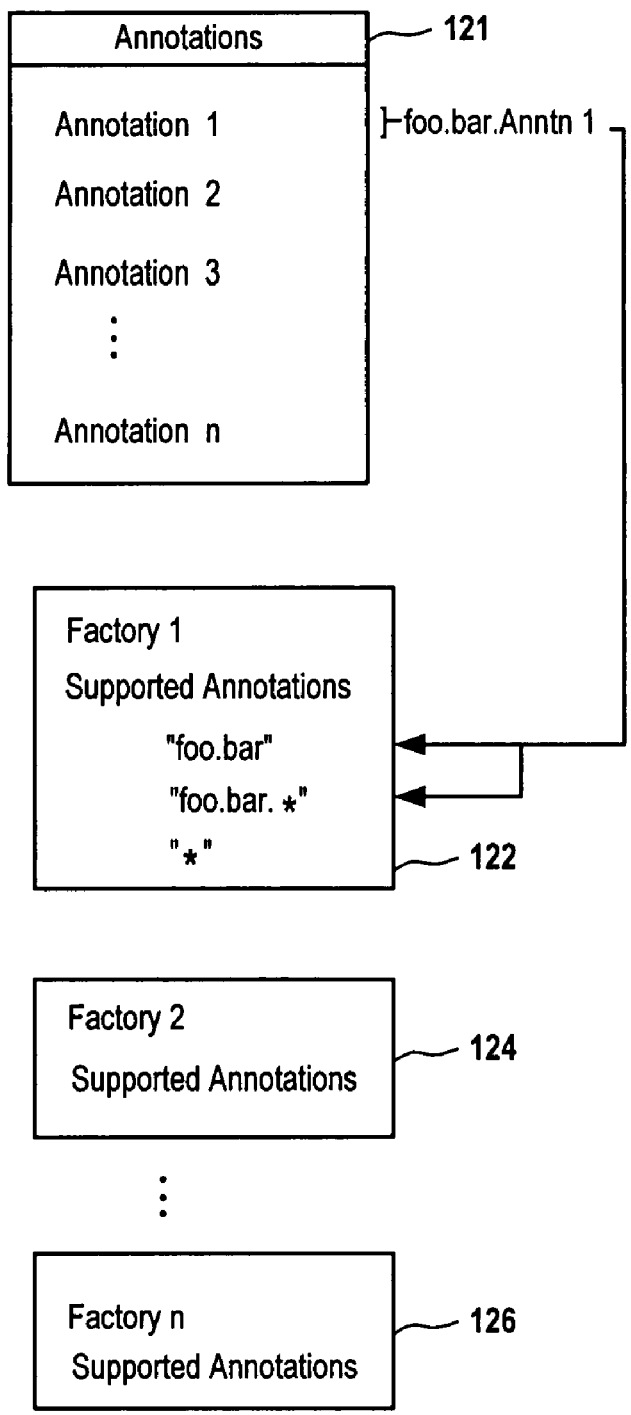
FIG. 4 is a simplified schematic diagram illustrating the matching of annotations with factories in accordance with one embodiment of the invention.

FIG. 4 is a simplified schematic diagram illustrating the matching of annotations with factories in accordance with one embodiment of the invention. As described above, the source files are parsed to identify all the annotations. A list of annotations 121 represents the result of the processing of the source files/class files to look at the structure of the code to determine the annotations present therein. In one embodiment, list 121 represents one exemplary data structure resulting from the partial compilation of the source file to determine the annotations contained therein. The annotations within list 121 are then successively matched with a factory that will support the annotation. That is, the list of factories, which may include factory 1 122, factory 2 124, factory n 126, is generated and from each factory it is determined which annotations are supported. As described above, an algorithm for finding the factories, e.g., sun.misc.Service may be utilized. Thereafter, the factories supply the annotations supported to the tool. Here, the factories may be queried to determine what annotations they process through the supportedAnnotationTypes method. In addition to listing particular supported annotation types by name, a factory may claim a set of names by using a syntax similar to import statements where "foo.bar.*" indicates all annotations whose names have the prefix "foo.bar." are supported. The syntax "*" indicates all sets of annotations are supported, including an empty set. If a factory supports one of the annotations present in list 121, then that annotation is considered claimed. For example, annotation 1, which may represent foo.bar.Anntn1, will be checked against each factory until a match is found that indicates the factory will support the annotation. Factory 1-122 with supported annotations as "foo.bar" "foo.bar.*" and "*". Here, annotation 1 does not match with "foo.bar" however annotation 1 will be supported by "foo.bar.*"

If annotation 1 did not find a match in factory 1 122, annotation 1 would then be checked against factory 2 124 and so on. Thus, the annotations are compared against each of the factories in a determined order for each of the factories. This determined order may be used to resolve conflicts as discussed below. It should be appreciated that in one exemplary embodiment, an element of the result may be the canonical (fully qualified) name of a supported annotation type. Alternately, the element may be of the form "name.*" representing the set of all annotation types with canonical names beginning with "name." Finally, "*" by itself represents the set of all annotation types. In another embodiment, each of the annotations from list 121 is represented by the string which is then compared against a set of names that each factory supports, wherein, the set of names that each factory supports is depicted as a string also. Once a match is found, a processor is assigned to that annotation. This assignment may be achieved through the getProcessorFor method, which returns an annotation processor for a set of annotation types. The set will be empty if the factory supports "*" and the specified type declarations have no annotations. It should be noted that the set of annotation types may be empty for other reasons, such as giving the factory an opportunity to register a listener. An AnnotationProcessorFactory must gracefully handle an empty set of annotations. One exemplary appropriate response to an empty set will often be returning an annotation processor that does nothing at all (a NO-OP annotation processor).

Figure 5:
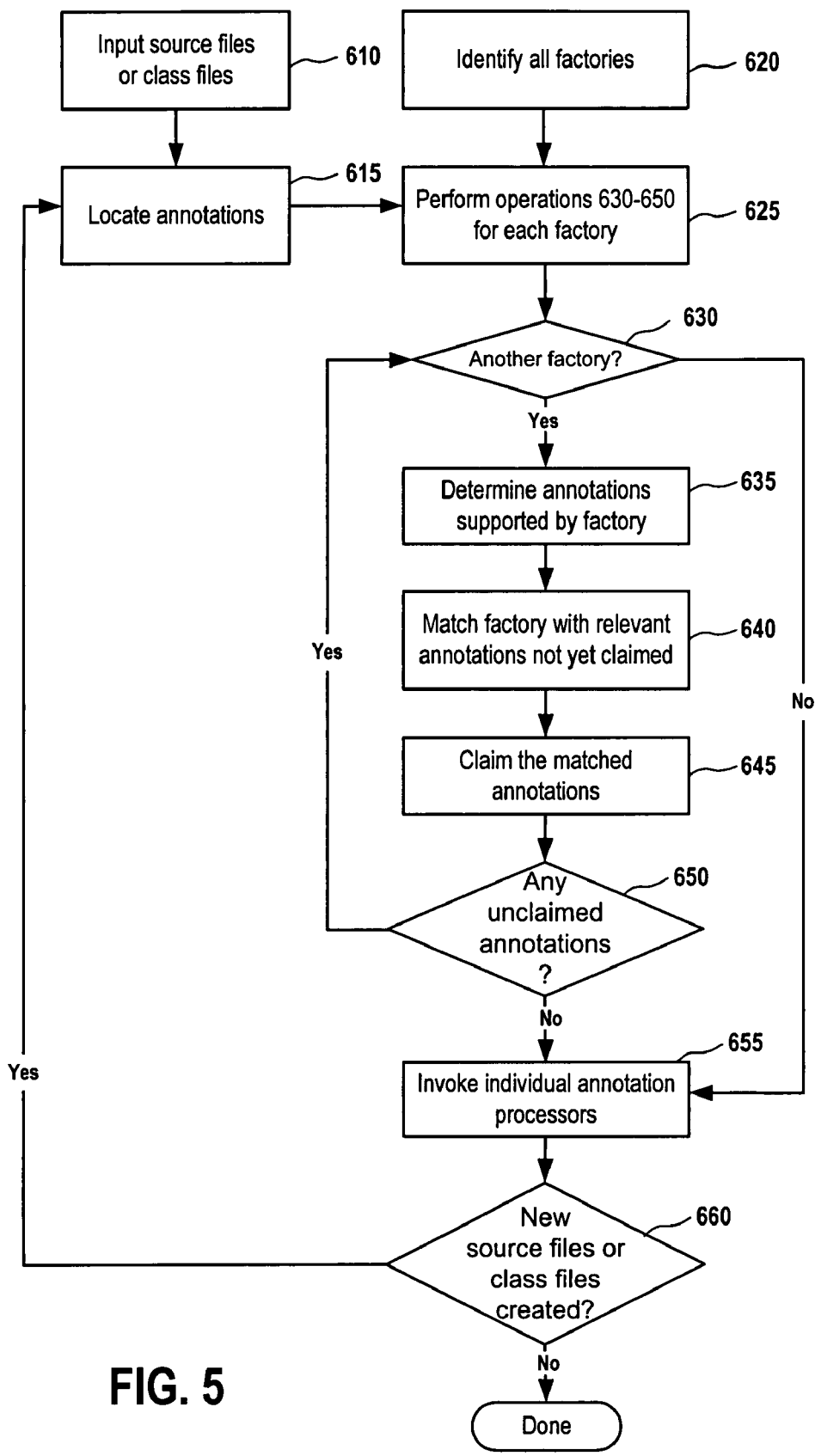
FIG. 5 is a flow chart diagram illustrating the method operations for explicitly processing annotations present in source files or class files in accordance with one embodiment of the invention.

FIG. 5 is a flow chart diagram illustrating the method operations for explicitly processing annotations present in source files or class files in accordance with one embodiment of the invention. In operation 610, the annotation processing tool inputs the source files or the class files. In one embodiment, a name of a class can be input from a command line. In another embodiment, a name of a class can be obtained from an output of an annotation processor. The input class files may or may not be referenced by source files. Then, in operation 615 the annotations within the source files or the class files are located. As discussed above with reference to FIG. 2, the code of the source files may be parsed or partially compiled to generate a data structure capturing the annotations in each of the source files. Operation 620 identifies factories available to the annotation processing tool. In operation 625, each factory is processed through the loop defined between operations 630-650. Thus, if seven factories were identified in operation 620, then the loop defined by operations 630-650 would execute seven times, i.e., once for each factory. In one embodiment, the list of factories may be generated lazily, i.e., it is not necessary to know all the factories at the initiation of the processing defined by operations 630-650. It should be appreciated that operations 610, 615 and operation 620 may run in parallel. In operation 620, the factories may be identified through the sun.misc.Service algorithm as discussed above with reference to FIG. 3. It should be further appreciated that the annotations supported by the factories may be provided from the factories through the supportedAnnotationTypes method.

Still referring to FIG. 5, the output from operation 625 is input into decision operation 630, where it is determined if another factory is available. If another factory is not found, then the method advances to operation 655 where the individual annotation processors are invoked. If another factory is found in operation 630, then the method advances to operation 635 where the annotations supported by the factory are identified. The method then proceeds to operation 640 where the factory is matched with the relevant annotations not yet claimed. In one embodiment, a list of annotations generated from operation 635 is compared against each of the supported annotations for each factory as described above with reference to FIG. 4. In operation 645, the matched annotations from operation 640 are claimed. In decision operation 650, it is determined whether unclaimed annotations exist. If there exists unclaimed annotations, then the method returns to operation 630 and repeats as described above. If there are not any unclaimed annotations, then the method moves to operation 655 where the individual annotation processors are invoked.

The method of FIG. 5 then advances to decision operation 660 where it is determined if new source files and/or new class files have been created. If new source files and/or new class files have been generated, then the method proceeds to operation 615 where the additional annotations are located. It should be appreciated that when the individual annotation processors are invoked in operation 655, additional source files or class files may be generated from this invocation. These additional source files or class files may contain additional annotations. If there are additional annotations, then these additional annotations are fed back to operation 615 where the annotations are located and proceed as described above. If it is determined that no new source files or class files have been created in operation 660, the method terminates. The method also terminates if the list of factories is exhausted as discussed above. It should be appreciated that as long as there are unclaimed annotations and more factories the tool will continue to ask the factories for processors.

In summary, the above described embodiments provide a tool to alleviate the end developer form maintaining consistency for multiple sets of code. This is achieved through an annotation processing tool that parses through source files or class files to determine the annotations present in the source files or the class files, and then finds available factories capable of providing annotation processors that support the annotations. When annotations present in class files are processed explicitly, the annotation processing tool directly accesses the class files to process the annotations. The explicitly processed class files may or may not be referenced by source files.

Although the present invention is described based on the Java programming language, other programming languages may be used to implement the embodiments of the present invention, such as other object oriented programming languages. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

An object is a generic term that is used in the object-oriented programming environment to refer to a module that contains related code and variables. A software application can be written using an object-oriented programming language whereby the program's functionality is implemented using objects. Examples of object-oriented programming languages include C++ as well as Java.

Furthermore the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention might employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

The above-described invention may be practiced with other computer system configurations including hand-held devices, microprocessor systems, microprocessor-based or programmable consumer electronics, minicomputers; mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data, which thereafter can be read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for processing annotations present in a file, comprising method operations of:
   receiving the file;
   identifying an annotation present in the file;
   identifying factories available for processing annotations;
   determining annotations supported by each of the available factories;
   arranging each of the available factories in a determined order such that conflicts between factories having different versions of a processor supporting the annotation present are resolved through the determined order; and
   assigning one of the available factories to process the annotation based on the annotation present in the file being supported by the one of the available factories.

2. The method of claim 1, wherein the file is one of a source file or a class file.

3. The method of claim 1, wherein the method operation of receiving the file includes,
   accepting a name of a class from a command line if the file is a class file.

4. The method of claim 1, wherein the method operation of receiving the file includes,
   obtaining a name of a class from an output of an annotation processor generated by one of the available factories if the file is a class file.

5. The method of claim 1, wherein the method operation of assigning one of the available factories to process the annotation based on the annotation present in the file being supported by the one of the available factories includes,
   matching the annotation present in the file with an annotation supported by one of the available factories.

6. The method of claim 5, wherein the method operation of matching the annotation present in the file with an annotation supported by one of the available factories includes,
   comparing names representing the annotation present in the file with the annotation supported by one of the available factories.

7. The method of claim 1, further comprising:
   repeating each of the method operations for a next annotation of the file.

8. The method of claim 7, wherein the one of the available factories is recalled for the next annotation when the one of the available factories does not support the next annotation.

9. The method of claim 1, wherein the method operation of identifying factories available for processing annotations includes, arranging the available factories in a determined order.

10. A computer readable storage medium having program instructions for providing annotation processors, comprising:
    program instructions for identifying an annotation present in a file;
    program instructions for identifying factories available for processing annotations;
    program instructions for determining annotations supported by each of the available factories;
    program instructions for arranging each of the available factories in a determined order such that conflicts between factories having different versions of a processor supporting the annotation present are resolved through the determined order; and
    program instructions for assigning one of the available factories to process the annotation based on the annotation present in the file being supported by the one of the available factories.

11. The computer readable storage medium of claim 10, wherein the file is one of a source file or a class file.

12. The computer readable storage medium of claim 10, wherein the program instructions for assigning one of the available factories to process the annotation based on the annotation present in the file being supported by the one of the available factories includes,
    program instructions for matching the annotation present in the file with an annotation supported by one of the available factories.

13. The computer readable storage medium of claim 12, wherein the program instructions for matching the annotation present in the file with an annotation supported by one of the available factories includes,
    program instructions for comparing names representing the annotation present in the file with the annotation supported by one of the available factories.

14. The computer readable storage medium of claim 10, further comprising:
    program instructions for repeating each of the method operations for a next annotation of the file.

15. The computer readable storage medium of claim 14, wherein the one of the available factories is recalled for the next annotation when the one of the available factories does not support the next annotation.

16. The computer readable storage medium of claim 10, wherein the program instructions for identifying factories available for processing annotations includes,
    program instructions for arranging the available factories in a determined order.

17. An annotation processing tool for processing annotations present in a file, the annotation processing tool discovering annotation processors according to method operations comprising:
    receiving the file;
    analyzing the file to identify an annotation present in the file;
    searching for available factories;
    extracting supported annotations for each of the available factories;
    arranging each of the available factories in a determined order such that conflicts between factories having different versions of a processor supporting the annotation present are resolved through the determined order; and
    matching the annotation present in the file with one of the factories, wherein the one of the factories supports the annotation.

18. The annotation processing tool of claim 17, where the file is one of a source file or a class file.

19. The annotation processing tool of claim 17, wherein one of the factories generates an annotation processor that supports a corresponding supported annotation.

20. The annotation processing tool of claim 17, further comprising:
    invoking an annotation processor supporting the annotation;
    determining if a next annotation is present in the file;
    if the next annotation is present, then the method includes,
    matching the next annotation with one of the factories; and
    invoking the next annotation processor.

21. The annotation processing tool of claim 17, wherein the receiving of the file includes,
    accepting a name of a class from a command line if the file is a class file.

22. The annotation processing tool of claim 17, wherein the receiving of the file includes,
    accepting a name of a class from an output of an annotation processor generated by one of the available factories if the file is a class file.

\* \* \* \* \*